United States Patent [19]

Henderson

[11] Patent Number: 5,259,081
[45] Date of Patent: Nov. 9, 1993

[54] PORTABLE WHEEL CHAIR RAMP AND RESTRAINING DEVICE

[76] Inventor: James Henderson, 872 Lovers La., Houston, Tex. 77091

[21] Appl. No.: 657,466

[22] Filed: Feb. 19, 1991

[51] Int. Cl.⁵ .................... E01D 15/04; B60P 7/08
[52] U.S. Cl. .................... 14/71.1; 70/226; 296/61; 296/65.1; 410/3; 410/19; 410/22
[58] Field of Search ............... 14/71.1, 69.5; 414/537, 414/921; 296/61, 65.1, 62, 51; 248/503.1, 503; 410/3, 4, 19, 30, 22

[56] References Cited

U.S. PATENT DOCUMENTS

| | | | |
|---|---|---|---|
| 3,352,440 | 11/1967 | Wilson | 296/61 X |
| 3,642,156 | 2/1972 | Stenson | 414/537 |
| 3,713,553 | 1/1973 | Curtis et al. | 414/537 |
| 3,874,527 | 4/1975 | Royce | 14/71.1 X |
| 3,955,847 | 5/1976 | Schiowitz | 296/65.1 |
| 4,062,209 | 12/1977 | Downing et al. | 70/226 |
| 4,084,713 | 4/1978 | Rohrs et al. | 14/69.5 X |
| 4,325,576 | 4/1982 | Guthrie | 296/65.1 |
| 4,407,616 | 10/1983 | Hinze | 410/3 |
| 4,475,762 | 10/1984 | DeLong et al. | 296/65.1 X |
| 4,601,620 | 7/1986 | Bugger et al. | 296/65.1 X |
| 4,730,964 | 3/1988 | Joyner | 296/65.1 X |
| 4,735,454 | 4/1988 | Bernard | 296/61 |
| 4,827,548 | 5/1989 | Hood | 14/71.1 |
| 4,966,516 | 10/1990 | Vartanian | 414/537 |

Primary Examiner—Hoang C. Dang
Attorney, Agent, or Firm—Kenneth D. Baugh

[57] ABSTRACT

A wheel chair ramp and restraining device 10 for positioning a wheel chair 64 in a vehicle 12 is provided. The wheel chair ramp and restraining device in accordance with the principles of this invention includes a ramp 20 having first and second platform members 22 and 24 respectively. The first platform member 22 is pivotably coupled to an entrance of the vehicle 12 and the second platform member 24 is pivotably coupled to first platform member. The coupling arrangement allows the first and second platform members 22 and 24 to be folded and stored in an upright position in the vehicle 12 or extended diagonally out of the vehicle to provide a surface for moving the wheel chair 64 into and out of the vehicle. The device also includes a restraining assembly 70 having a mechanism for locking device 86 for engaging each of the wheels 66 of the wheel chair 64 once the wheel chair is moved into the vehicle. This allows the wheel chair 64 to be held in a stationary position in the vehicle 12 thus allowing the persons confined therein to be transported safely.

12 Claims, 4 Drawing Sheets

PORTABLE WHEEL CHAIR RAMP AND RESTRAINING DEVICE

TECHNICAL FIELD

This invention relates to a vehicle wheel chair ramp and more particularly a wheel chair ramp and restraining device for transporting wheel chairs onto vehicles and restraining the chair therein. For many years wheel chairs have been a necessary tool in transporting disabled persons. Because of the necessity of the wheel chair as a tool for transporting disabled persons it is desirable to be able to transport the wheel chair with the person confined therein in vehicles. Because of the size of the wheel chair it is common to use vehicles such as vans to transport the chair and confined person. Consequently, it is desirable to provide a wheel chair ramp and restraining device that can be readily mounted to a vehicle thus providing access to the vehicle and also allowing proper restraint of the chair in the vehicle.

BACKGROUND ART

There are a number of different arrangements available today for allowing a wheel chair to be transported in a vehicle.

One such arrangement is disclosed in U.S. Pat. No. 3,874,527. In this arrangement the vehicle door is modified to include a power operated lift assembly. This arrangement is effective, however because of the need to modify the door of the vehicle and the power operated component, this arrangement can be cost prohibitive for some. The cost of using this arrangement can be increased evenmore because of the need to also get a restraining device in that this arrangement does not facilatate restraining the wheel chair once it is put in the vehicle.

Another arrangement is disclosed in U.S. Pat. No. 4,827,548. This invention relates to an extendable and retractable vehicle ramp which includes a power activating mechanism. This arrangement can also be costly and also does not address the issue of restraining the wheel chair once in the vehicle. Although these devices are suitable for the purposes they serve it is desirable to have a device which is inexpensive while facilating both the transporting of the wheel chair into the vehicle and the restraining of the chair once within the vehicle.

DISCLOSURE OF THE INVENTION

A wheel chair ramp and restraining device for positioning a wheel chair in a vehicle is provided. The wheel chair ramp and restraining device in accordance with the principles of this invention includes a first and second platform member. The first platform member is pivotably coupled to an entrance of the vehicle and the second platform member is pivotably coupled to the first platform member. The coupling arrangement allows the first and second platform members to be folded and stored in an upright position in the vehicle or extended diagonally out of the vehicle to provide a surface for moving the wheel chair into and out of the vehicle. The device also includes a means for lockingly engaging each of the wheels of the wheel chair once the wheel chair is moved into the vehicle. This allows the wheel chair to be held in a stationary position in the vehicle thus allowing the persons confined therein to be transported safely.

BRIEF DESCRIPTION OF THE DRAWING

The details of the invention will be described in connection with the accompanying drawl in which.

BEST MODE FOR CARRYING OUT THE INVENTION

Figure 1:
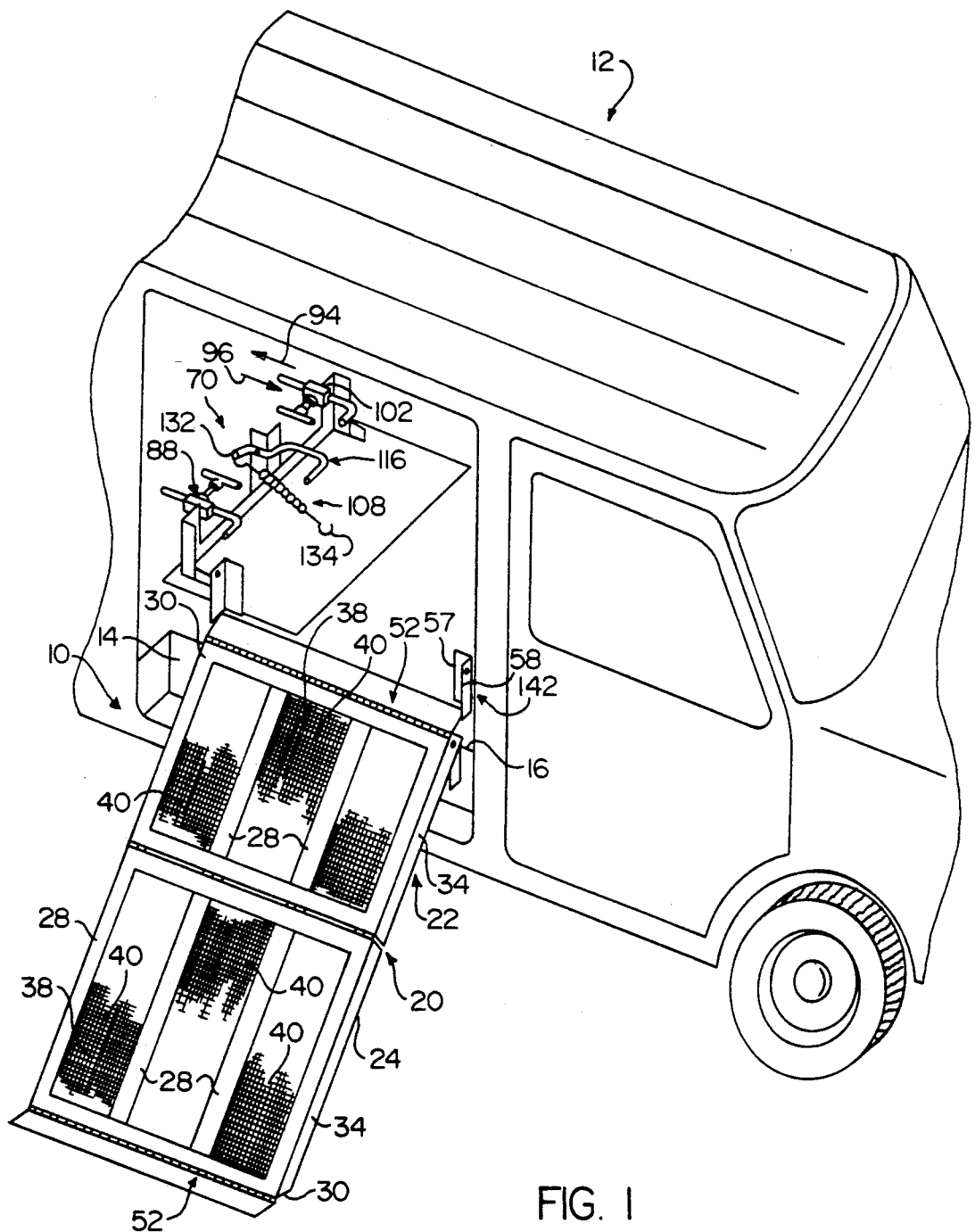
FIG. 1 is a prospective view illustrating a wheel chair ramp and restraining device in accordance with the principles of the invention.
Figure 2:
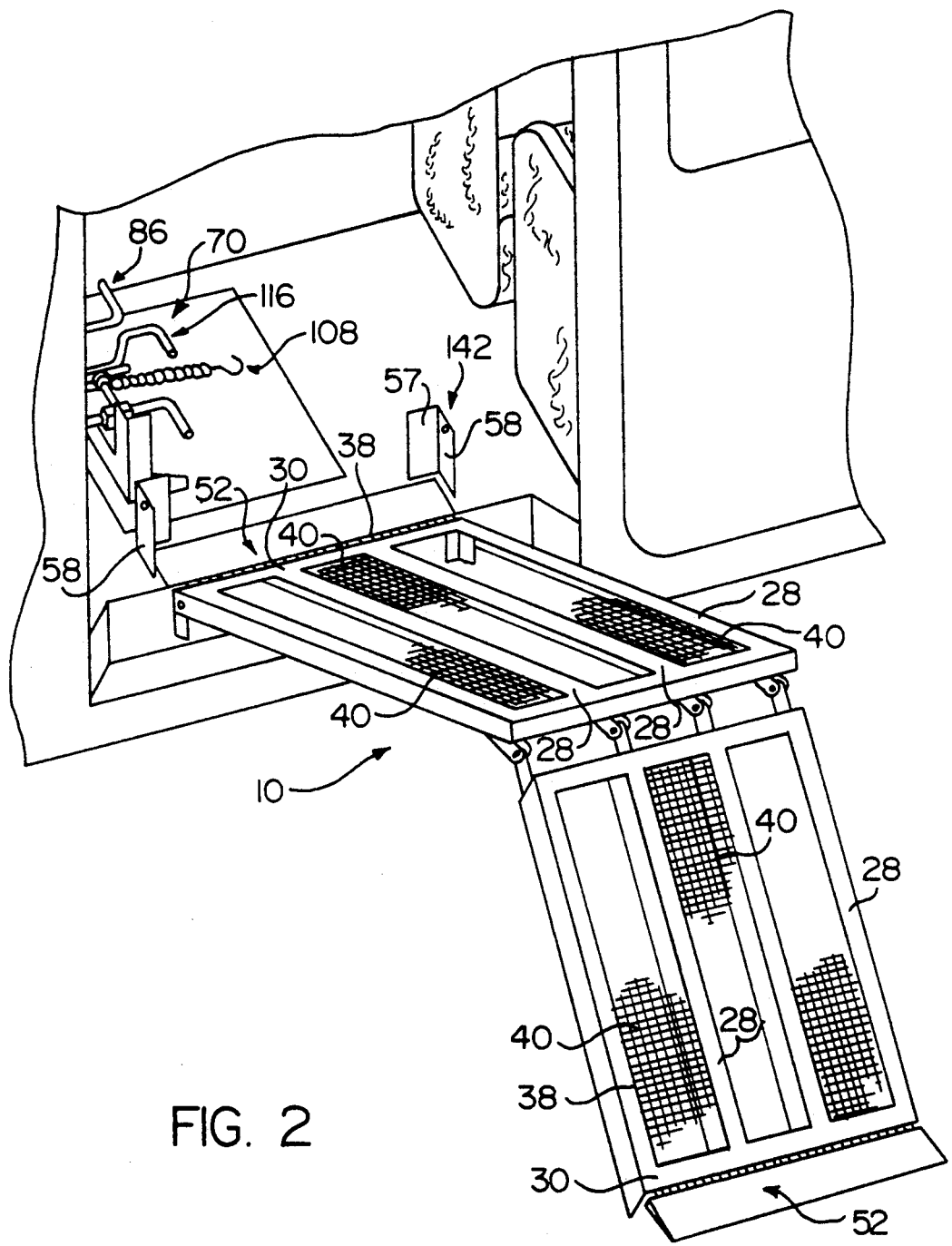
FIG. 2 is another prospective view of the wheel chair ramp and restraining device in accordance with the principles of the invention.

As illustrated in FIGS. 1 and 2, a wheel chair ramp and restraining device, generally designated, by the numeral, 10 is provided to be coupled to a vehicle, generally designated, by the numeral 12. The wheel chair ramp and restraining device 10 is coupled to the vehicle 12 in a side entrance 14 thereof on a raised floor board 16.

The wheel chair ramp and restraining device 10 is provided with a ramp, generally designated by the numeral, 20 having a pair of platform support members, generally designated, by the numerals, 22 and 24. Each platform support member 22 and 24 includes a plurality of spaced parallel aligned longitudinally extending members 28 which are coupled together at each end thereof by laterally extending members 30. The laterally extending members 30 are provided with downwardly extending end members 32 (FIG. 2). Side rails 34 are coupled to the outermost longitudinally extending members 28 and the laterally extending members 30 of the platform members 22 and 24. The side rails 34 are provided with a plurality of raised members 36 which will keep wheels from rolling off the ramp 20. A metal grading, generally designated, by the numeral 38 having apertures 40 formed therein is coupled between each of the longitudinally extending members 28 to form a no skid surface for the ramp 20.

The platform support members 22 and 24 are pivotably coupled to each other by coupling members, generally designated by the numeral, 42 (FIG. 2). The coupling members 42 are provided with spaced aligned support arms 44 which are coupled to the platform support member 22.

The coupling members 42 also includes a plurality of pivot arms 46 which are coupled to the platform support member 24. The pivot arms 46 are alignable between an adjacent pair of support arms 44 and coupled for pivotable movement therebetween by a coupling pin 48 which extends into apertures 50 in the support arms 44 and pivot arm 46. The apertures 50 in the support arms 44 and pivot arms 46 are slightly larger than the pin 48. This facilatates the pivotal movement of the platform support member 24. A cover plate, generally designated by the numeral 52, is pivotably coupled to the front laterally extending member 30 of the platform support member 22 and the rear laterally extending member of the platform support member 24 by a pivot member 54.

Figure 3:
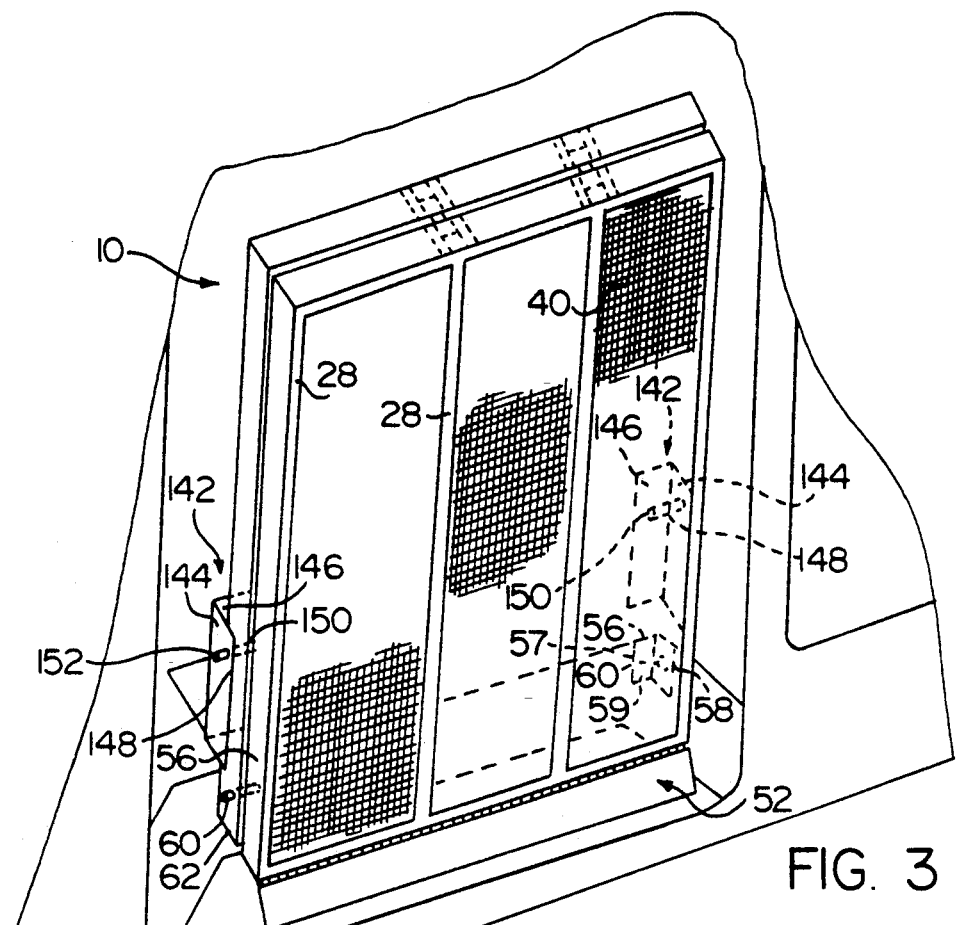
FIG. 3 is a prospective view of the wheel chair ramp and restraining device illustrating the ramp pivoted to a folded position in accordance with the principles of the invention.

The front laterally extending member 30 of the platform support member 22 is coupled to the entrance 16 of the vehicle by spaced aligned brackets 56 (FIG. 3). The brackets 56 are provided with perpendicularly coupled members 57 and 58. The member 57 of the bracket 56 is coupled to the vehicle entrance 16 by bolts 59 and the member 58 is aligned adjacent the side rails 34. The brackets 56 are pivotably coupled to each side of the platform support member 22 between the laterally extending member 30 and side rail 34 by a pivot pin 60 which extends through apertures 62 in the member 58 of the bracket 56 and the side rail 34. This permits pivotal movement of the platform member 22 to a vertical upright position as illustrated in FIG. 3.

Figure 4:
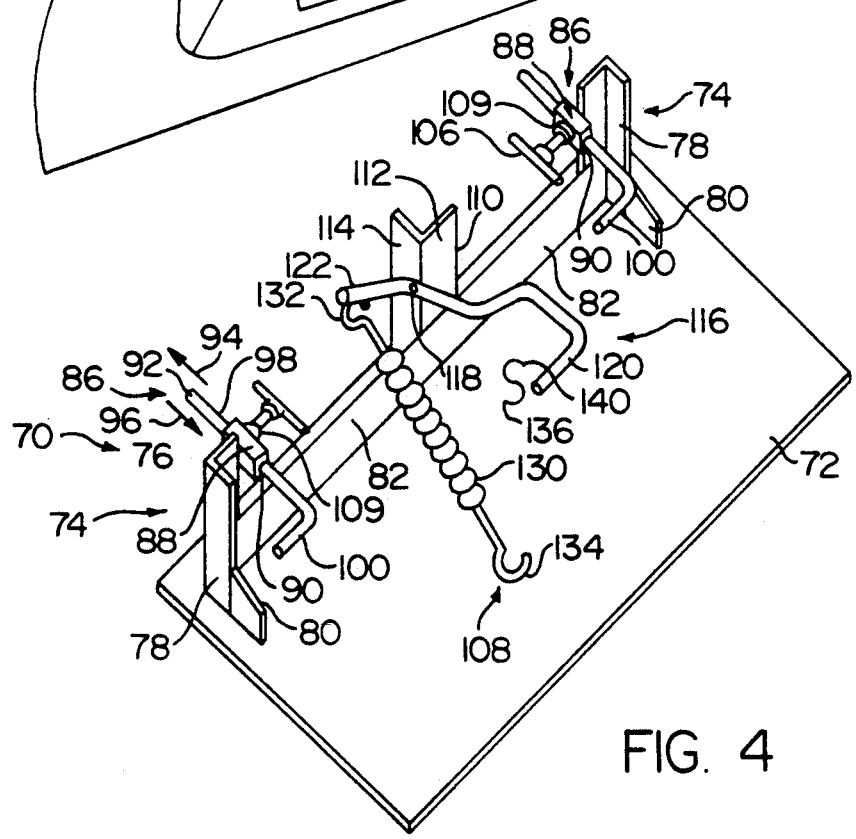
FIG. 4 is a perspective view illustrating the restraining device of a wheel chair ramp and restraining device in accordance with the principles of the invention.
Figure 5:
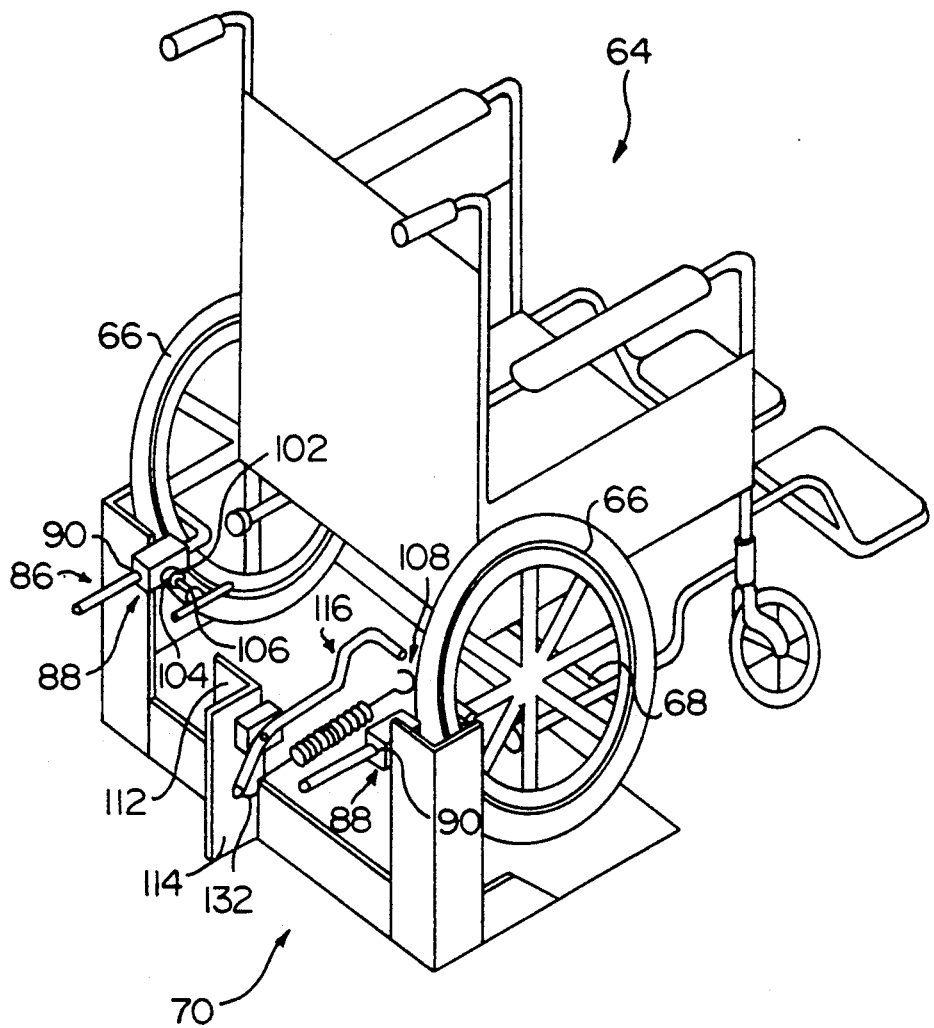
FIG. 5 is a perspective view illustrating a wheel chair secured in place in the restraining device of a wheel chair ramp and restraining device in accordance with the principles of the invention.

Referring to FIGS. 4 and 5 the wheel chair ramp and restraining device 10 also includes a restraining assembly, generally designated, by the numeral 70. The restraining assembly 70 is provided to hold and secure a wheel chair 64 (FIG. 5) in place in the vehicle 12. The restraining assembly 70 is provided with a planar base support member 72 which is coupled to the floor board 16 of the vehicle 12. The restraining assembly 70 also includes a pair of spaced aligned wheel support members, generally designated by the numeral, 74. The wheel support members 74 are provided to position wheels 66 of the wheel chair 64 in place in the restraining assembly 70. The wheel support members 74 are formed with two perpendicularly coupled upstanding members 76 and 78. A guide member 80 is coupled to the lowermost portion of each of the upstanding members 78. The wheel support members 74 are coupled in spaced relationship to each other by a coupling member 82 which is secured to the base member 72.

A locking device, generally designated, by the numeral, 86 is coupled to each of the wheel support members 74 at an uppermost portion of the upstanding member 76. Each locking device 86 is provided with a rectangularly shaped support member, generally designated by the numeral, 88 having an aperture 90 formed therethrough. A locking arm, generally designated by the numeral 92 is mounted for slidable and rotable movement in the aperture 90 of the member 88 as illustrated by arrows 94 and 96.

The locking arm 92 is provided with an elongated member 98 which is mounted in the aperture 90 of the member 88 and an engaging arm or handle 100 which is perpendicularly coupled to the elongated member. The dimensions of the elongated member 98 are slightly less than the dimensions of the aperture 90 thereby permitting the elongated member to be rotated and slide in the body member 88 as desired. The body member 88 is also provided with an access opening 102 in one side thereof. The access opening 102 includes a threaded protruding member 104 which is provided to receive a screw 106. The screw 106 is set in the access opening 102 to selectively engage the elongated member 98. When the screw 106 engages the elongated member 98 it locks the locking arm 90 in a desired position. This permits the locking arm 90 to be locked in engagement with the wheel 66 of the wheel chair 64 when the wheel chair is placed in the restraining device 70. (FIG. 5 ).

The restraining assembly 70 is provided with a second locking device, generally designated, by the numeral, 108. The locking device 108 is provided with an upstanding support member, generally designated by the numeral, 110 having perpendicularly coupled support members 112 and 114. The locking device 108 includes an arm, generally designated by the numeral, 116 which is pivotably coupled to the support member 112 by a pin 118. The arm 116 is provided with a handle 120 coupled to one end thereof. A spring, generally designated by the numeral, 130 having hooks 132 and 134 coupled to opposite ends thereof is provided. The hook 132 of the spring 130 is coupled to the arm 116 in an aperture 122 formed in the arm. The other hook 134 of the spring 130 is provided to engage a horizontally extending support bar 68 on the wheel chair 64. When the hooks 132 and 134 are in place on the arm 116 and the wheel chair 64 the arm can be pivoted downwardly to lock the wheel chair in place. The arm 116 can be held in a downward position by a hook 136 which has portions 138 thereof which engage the spring 130 and other portions 140 which engages the arm. The locking device 108 can be used in addition to the locking device 86 or it can be used independently.

The wheel chair ramp and restraining device 10 is also provided with coupling members, generally designated by the numeral 142 (FIG. 3) which are aligned on each side of the cover plate 52 of the platform support member 22 and coupled to the floor 16 of the vehicle 12. Each of the coupling members 142 is provided wich upstanding members 144 and 146 which are perpendicualarly coupled to each other. The upstanding member 144 is provided with an aperture 148 which is alignable adjacent an aperture 150 in the side of the platform support member 22 when it is pivoted to an upright position. A pivot pin 152 is provided to set in the aperture 148 of the upstanding member 144 and the aperture 150 in the the platform support member 22. The coupling members 142 are provided to couple of the ramp 20 in a vertical upright folded position in the vehicle 12 when it is not in use.

The wheel chair ramp and restraining device 10 is provided to allow a wheel chair 64, which normally transportes a disabled persons (not shown), to be rolled into the vehicle 12 and restrained therein to allow the confined person to be safely transported in the vehicle.

When it is desired to put a wheel chair 64 in the vehicle 12 the ramp 20 is unfolded and extended as illustrated in FIG. 1. The wheel chair 64 can then be rolled up the ramp 20 and backed into the restraining assembly 70 so that the wheels 66 engage the wheel support members 74 (FIG. 5). The wheel chair 64 can then be secured in the restraining assembly 70 by adjusting the locking device 86 adjacent each wheel 66 to engage the wheel and thereby lock the wheels in a stationary position in the wheel support members 74. This is accomplished by adjusting the locking arm 90 of each locking device 86 so that the engaging handle 100 engages inner portions of the tire 66 and holds it up against the wheel support members 74. The ramp 20 can then be folded to an upright position and locked in place by the coupling members 142. The vehicle 12 can then proceed on its journey with the wheel chair 64 safely locked in place.

The wheel chair can also be secured independent of or in conjunction with the locking device 86 by utilizing the locking device 108. In this embodiment once the wheels 66 are aligned in the wheel supports 74 the hook 134 of the spring 130 is placed on the support bar 68 of the wheel chair 64. The arm 116 is then pushed downward and locked in place by the hook 136. This causes the spring 136 to immobilize the wheel chair 64 in the vehicle 12. When it is desired to release the wheel chair 64 the hook 136 is removed so the handle can be raised thus allowing the spring to be removed from the wheel chair.

It should be understood that various changes and modifications can be made without departing from the spirit and scope of the invention as defined in the following claims.

What is claimed:

1. A wheel chair ramp and restraining device for positioning a wheel chair in a vehicle including:
   a first platform member;
   a first coupling means for pivotably coupling the first platform member in an entrance to the vehicle so that the first platform member can be moved to a vertical position and so that the first platform member can be moved to a diagonal position;
   a second platform member;
   a second coupling means for pivotably coupling the second platform member to the first platform member so that the second platform member can be moved to a vertical position when the first platform member is in a vertical position and so that the second platform member can be moved to a diagonal position when the 20 first platform member is in a diagonal position thereby allowing the first and second platform members to be folded and diagonally extended to provide a surface to move the wheel chair into the vehicle;
   a base support member coupled to a floor of the vehicle;
   a first upstanding member coupled to one side of the base support member;
   a second upstanding member coupled to the other side of the base support member;
   a third upstanding member coupled to the one side of the base support member and perpendicularly coupled to the first upstanding member;
   a fourth upstanding member coupled to the other side of the base support member and perpendicularly coupled to the second upstanding member;
   a first guide member coupled to the base support member and the third upstanding member;
   a second guide member coupled to the base member and the fourth upstanding member;
   a first support member, having an aperture extending therethrough and an access opening formed in one side thereof, coupled to an upper portion of the first upstanding member;
   a first elongated member aligned in the aperture in the first support member for slidable and rotatable movement therein;
   a first engaging arm perpendicularly coupled to one end of the first elongated member;
   means coupled in the access opening of the first support member for selectively engaging the elongated member to hold the first engaging arm against one wheel of the wheel chair thereby locking the wheel in a predetermined stationary position in the vehicle;
   a second support member, having an aperture extending therethrough and an access opening formed in one side thereof, coupled to an upper portion of the second upstanding member;
   a second elongated member aligned in the aperture in the second support member for slidable and rotatable movement therein;
   a second engaging arm perpendicularly coupled to one end of the second elongated member;
   means coupled in the access opening of the second support member for selectively engaging the second elongated member to hold the second engaging arm against the other wheel of the wheel chair thereby locking the wheel in a predetermined stationary position in the vehicle.

2. A wheel chair ramp and restraining device as defined in claim 1 wherein the first platform member includes:
   a plurality of spaced parallel aligned longitudinally extending members;
   a first laterally extending member coupled to a front end of the plurality of spaced parallel aligned longitudinally extending members;
   a second laterally extending member coupled to the other end of the plurality of spaced parallel aligned longitudinally extending members;
   a first side rail, having a pair of spaced apertures formed therein, coupled between the first and second laterally extending members to one of the outermost longitudinally extending members of the plurality of spaced aligned parallel aligned longitudinally extending members;
   a second side rail, having a pair of spaced apertures formed therein, coupled between the first and second laterally extending members to the other one of the outermost longitudinally extending member of the plurality of spaced parallel aligned longitudinally extending members; and
   means coupled between each of the longitudinally extending members to form a surface thereon.

3. A wheel chair ramp and restraining device as defined in claim 2 wherein the first coupling means includes:
   a first member for coupling one end of the first laterally extending member to the entrance of the vehicle;
   a second member, having an aperture formed therein, perpendicularly coupled to the first member and aligned with the first side rail so that the aperture therein is aligned with one of the pair of apertures in the first side rail;
   a first pivot pin aligned in the apertures in the second member and the first side rail;
   a third member for coupling the other end of the first laterally extending member to the entrance of the vehicle;
   a fourth member, having an aperture formed therein, perpendicularly coupled to the third member and aligned with the second side rail so that the aperture therein is aligned with one of the pair of apertures in the second side rail; and
   a second pivot pin aligned in the apertures in the fourth member and the second rail.

4. A wheel chair ramp and restraining device as defined in claim 3 wherein the second platform member includes:
   a plurality of spaced parallel aligned longitudinally extending members;
   a first laterally extending member coupled to a front end of the plurality of spaced parallel aligned longitudinally extending members;
   a second laterally extending member coupled to the other end of the plurality of spaced parallel aligned longitudinally extending members;

a first side rail coupled between the first and second laterally extending members to one of the outermost longitudinally extending members of the spaced parallel aligned longitudinally extending members;

a second side rail coupled between the first and second laterally extending members to the other one of the outermost longitudinally extending members of the plurality of spaced parallel aligned longitudinally extending members; and means coupled between each of the longitudinally extending members to form a surface thereof.

5. A wheel chair ramp and restraining device as defined in claim 4 wherein the second coupling means includes:

a plurality of spaced aligned support arms coupled to the second laterally extending member of the first platform member, each one of the plurality of support arms having an aperture formed therein;

a plurality of pivot arms coupled to the first laterally extending member of the second platform member, each one of the plurality of pivot arms having an aperture formed therein, and each one of the plurality of pivot arms being aligned between an adjacent pair of the plurality of support arms; and a plurality of coupling pins, each one of the plurality of coupling pins aligned in the apertures of one of the plurality of pivot arms and the adjacent pair of support arms.

6. A wheel chair ramp and restraining device as defined in claim 5 including a third coupling means for locking the first and second platform members in a vertical position in the vehicle.

7. A wheel chair ramp and restraining device as defined in claim 6 wherein the third coupling means includes:

a first upstanding member coupled to the floor of the vehicle adjacent one end of the first laterally extending member;

a second upstanding member having an aperture formed therein, perpendicularly coupled to the first upstanding member and aligned with the first side rail when the first platform member is in a vertical position so that the aperture is aligned with the other one of the pair of apertures in the first side rail;

a first pivot pin alignable in the apertures in the second upstanding member and the first side rail;

a third upstanding member coupled to the floor of the vehicle adjacent the other end of the first laterally extending member;

a fourth upstanding member having an aperture formed therein, perpendicularly coupled to the third upstanding member and aligned with the second side rail when the first platform member is in a vertical position so that the aperture is aligned with the other one of the pair of apertures in the second side rail; and a second pivot pin alignable in the aperture in the second upstanding member and the second 8. A wheel chair ramp and restraining device as defined in claim 7 further including a means couplable to a horizontally extending support member on the wheel chair for lockingly engaging the wheel chair in a predetermined position.

9. A wheel chair ramp and restraining device as defined in claim 8 wherein the means for lockingly engaging the wheel chair includes:

an arm pivotably coupled to the upstanding support member;

a spring, having one end thereof, coupled to one end of the arm and the other end thereof coupled to the horizontally extending support member on the wheel chair; and a handle coupled to the other end of the arm so that when the handle is pivoted downwardly, the spring is moved to lock the wheel chair in place.

10. A wheel chair ramp and restraining device as defined in claim 9 wherein the means for lockingly engaging the wheel chair further includes means for holding the handle of the arm in a downward position.

11. A wheel chair ramp and restraining device for positioning a wheel chair in a vehicle including:

a first platform member;

a first coupling means for pivotably coupling the first platform member in an entrance to the vehicle so that the first platform member can be moved to a vertical position and so that the first platform member can be moved to a diagonal 10 position;

a second platform member;

a second coupling means for pivotably coupling the second platform member to the first platform member so that the second platform member can be moved to a vertical position when the first platform member is in a vertical position and so that the second platform member can be moved to a diagonal position hen the first platform member is in a diagonal position thereby allowing the first and second platform members to be folded and diagonally extended to provide a surface to move the wheel chair into the vehicle;

an upstanding support member coupled to a floor of the vehicle;

an arm pivotably coupled to the upstanding support member;

a spring, having one end thereof, coupled to one end of the arm and the other end thereof coupled to a horizontally extending support member on the wheel chair; and a handle coupled to the other end of the arm so that when the handle is pivoted downwardly, the spring is moved to lock the wheel chair in a predetermined stationary position in the vehicle.

12. A wheel chair ramp and restraining device as defined in claim 11 wherein the means for lockingly engaging the wheel chair further includes means for holding the handle of the arm in a downward position.

* * * * *